United States Patent
Lavi et al.

(10) Patent No.: US 12,360,877 B2
(45) Date of Patent: Jul. 15, 2025

(54) TECHNIQUES FOR ALERTING METRIC BASELINE BEHAVIOR CHANGE

(71) Applicant: Microsoft Technology Licensing, LLC, Redmond, WA (US)

(72) Inventors: Yaniv Lavi, Tel Aviv-Jaffa (IL); Rachel Lemberg, Herzliya (IL); Raphael Fettaya, Tel Aviv (IL); Dor Bank, Tel Aviv (IL); Linoy Liat Barel, Modi'in (IL)

(73) Assignee: Microsoft Technology Licensing, LLC

( * ) Notice: Subject to any disclaimer, the term of this patent is extended or adjusted under 35 U.S.C. 154(b) by 0 days.

(21) Appl. No.: 16/899,310

(22) Filed: Jun. 11, 2020

(65) Prior Publication Data
US 2021/0089425 A1 Mar. 25, 2021

Related U.S. Application Data

(60) Provisional application No. 62/905,053, filed on Sep. 24, 2019.

(51) Int. Cl.
*G06F 11/34* (2006.01)
*G06F 16/28* (2019.01)
*G06F 17/18* (2006.01)

(52) U.S. Cl.
CPC ...... *G06F 11/3452* (2013.01); *G06F 11/3409* (2013.01); *G06F 16/285* (2019.01); *G06F 17/18* (2013.01)

(58) Field of Classification Search
CPC ............... G06F 11/3452; G06F 16/285; G06F 11/3409; G06F 17/18
See application file for complete search history.

(56) References Cited

U.S. PATENT DOCUMENTS

| | | | |
|---|---|---|---|
| 2010/0088054 A1* | 4/2010 | Miguelanez | G05B 23/0278 702/183 |
| 2016/0188396 A1* | 6/2016 | Sonalker | G06F 11/079 714/37 |
| 2016/0196174 A1* | 7/2016 | Jacob | G06F 11/079 714/37 |
| 2016/0210556 A1* | 7/2016 | Ben Simhon | G06N 20/00 |
| 2016/0213271 A1* | 7/2016 | Osorio | A61B 5/35 |
| 2018/0039555 A1* | 2/2018 | Salunke | G06F 11/3006 |

(Continued)

OTHER PUBLICATIONS

Cook ("Using Radial Basis Function Neural Networks to Recognize Shifts in Correlated Manufacturing Process Parameters", IIE Transactions 30, pp. 227-234) (Year: 1998).*

(Continued)

*Primary Examiner* — Apu M Mofiz
*Assistant Examiner* — Farhad Agharahimi

(57) ABSTRACT

Examples described herein generally relate to alerting metric baseline behavior change. The examples include performing at least one of a radial basis function (RBF) kernel procedure and an autoencoding procedure for a time-series data; determining whether one or more change points occur in a seasonal pattern of the time-series data based on at least one of the RBF kernel procedure and the autoencoding procedure; and transmitting, to a user, an alert indicating the one or more change points based on a determination that the one or more change points occur in the seasonal pattern of the time-series data.

20 Claims, 6 Drawing Sheets

(56) References Cited

U.S. PATENT DOCUMENTS

| | | | |
|---|---|---|---|
| 2018/0159879 A1* | 6/2018 | Mestha | G06N 3/084 |
| 2018/0241764 A1 | 8/2018 | Nadolski et al. | |
| 2018/0322394 A1 | 11/2018 | Nguyen et al. | |
| 2019/0228312 A1* | 7/2019 | Andoni | G06F 18/2433 |
| 2021/0034994 A1* | 2/2021 | Stocker | G06N 5/04 |
| 2021/0042964 A1* | 2/2021 | Yeung | G06N 3/045 |

OTHER PUBLICATIONS

"International Search Report and Written Opinion Issued in PCT Application No. PCT/US20/050277", Mailed Date: Jan. 13, 2021, 12 Pages.

* cited by examiner

TECHNIQUES FOR ALERTING METRIC BASELINE BEHAVIOR CHANGE

CROSS-REFERENCE TO RELATED APPLICATION(S)

The present application claims benefit of U.S. Provisional Application No. 62/905,053 entitled "TECHNIQUES FOR ALERTING METRIC BASELINE BEHAVIOR CHANGE" filed Sep. 24, 2019, and is assigned to the assignee hereof and hereby expressly incorporated by reference herein.

BACKGROUND

Large-scale networked systems are provided as platforms employed in a variety of settings for running service applications and maintaining data for business and operational functions. Such networks may include and/or be a part of a data center (e.g., a physical cloud computing infrastructure) that may provide a variety of services (e.g., web applications, email services, search engine services, resource sharing services, etc.) for client computing devices connected to at least a portion of the network. These large-scale networked systems typically include a large number of resources distributed throughout the data center, where each resource may include or at least resemble a physical machine.

In the realm of telemetry for monitoring health of network resources, a vast number (e.g., billions) of metrics are collected from or for resources over a period of time (e.g., each second) of a given network. Due to the number of metrics, it may become difficult to keep track of the metrics and/or related signals, health status of the network resources, etc. In addition, when services experience issues, engineers that maintain the services and/or corresponding resources may be notified by system alarms tens or hundreds of times, and the engineers do not always know which alarm is the most important to respond to, or may miss important alarms due to the sheer number of alarms. Issues may also be caused by downstream dependencies, and without the necessary domain knowledge, it may be difficult to understand what signals are affecting a given service, and/or how to locate/determine a dependency that may ultimately be causing the issue.

SUMMARY

The following presents a simplified summary of one or more examples in order to provide a basic understanding of such examples. This summary is not an extensive overview of all contemplated examples, and is intended to neither identify key or critical elements of all examples nor delineate the scope of any or all examples. Its sole purpose is to present some concepts of one or more examples in a simplified form as a prelude to the more detailed description that is presented later.

In an example, a computer-implemented method for alerting metric baseline behavior change is provided. The method includes performing at least one of a radial basis function (RBF) kernel procedure and an autoencoding procedure for time-series data; determining whether one or more change points occur in a seasonal pattern of the time-series data based on at least one of the RBF kernel procedure and the autoencoding procedure; and transmitting, to a user, an alert indicating the one or more change points based on a determination that the one or more change points occur in the seasonal pattern of the time-series data.

In another example, a computing device for alerting metric baseline behavior change is provided. The computing device includes a memory storing one or more parameters or instructions for identifying related signals from a service event repository, and at least one processor coupled with the memory. The at least one processor is configured to execute instructions to perform at least one of a RBF kernel procedure and an autoencoding procedure for time-series data; determine whether one or more change points occur in a seasonal pattern of the time-series data based on at least one of the RBF kernel procedure and the autoencoding procedure; and transmit, to a user, an alert indicating the one or more change points based on a determination that the one or more change points occur in the seasonal pattern of the time-series data.

In another example, a non-transitory computer-readable medium, including code executable by one or more processors for alerting metric baseline behavior change, is provided. The code includes code for performing at least one of a RBF kernel procedure and an autoencoding procedure for a time-series data; code for determining whether one or more change points occur in a seasonal pattern of the time-series data based on at least one of the RBF kernel procedure and the autoencoding procedure; and code for transmitting, to a user, an alert indicating the one or more change points based on a determination that the one or more change points occur in the seasonal pattern of the time-series data.

To the accomplishment of the foregoing and related ends, the one or more examples comprise the features hereinafter fully described and particularly pointed out in the claims. The following description and the annexed drawings set forth in detail certain illustrative features of the one or more examples. These features are indicative, however, of but a few of the various ways in which the principles of various examples may be employed, and this description is intended to include all such examples and their equivalents.

DETAILED DESCRIPTION

Figure 1:
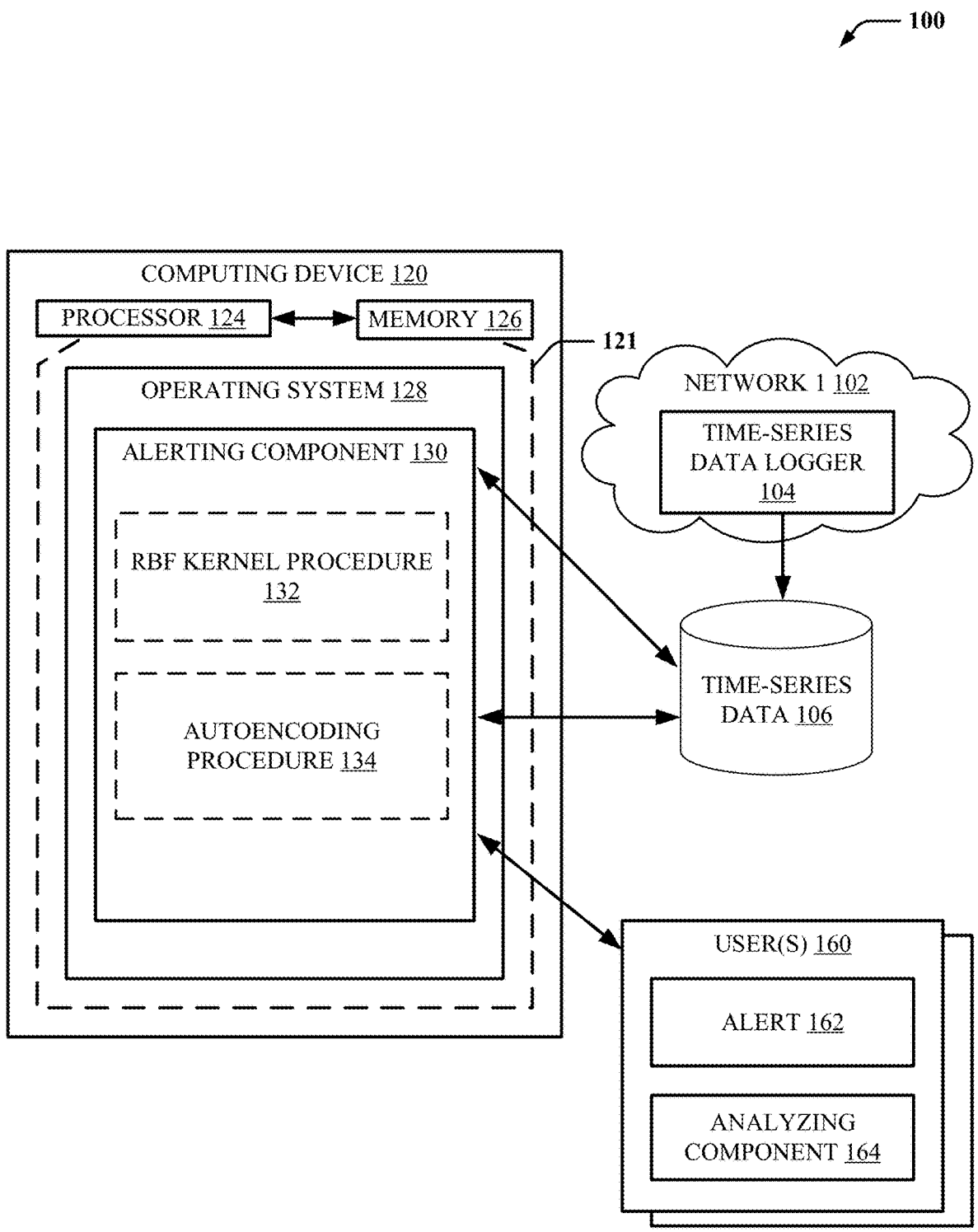
FIG. 1 is a schematic diagram of an example of a computing device for alerting metric baseline behavior change in accordance with examples described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various examples related to alerting metric baseline behavior change. For example, if a metric has some typical behavior corresponding to a specific point in time, after which the behavior changes in some way (e.g., the median values are different, the variance changes, the metric has more spikes or less spikes, the metric stops being seasonal, etc.) then this information on the change is very crucial and relevant for a user of a monitoring system. These changes are very common in a real life monitoring system. For example, these changes may be due to deployments to the service that change some flows and have large impact on some of the metrics in the service, outages in services, different upgrades/downgrades of hardware or software and many other scenarios.

In an aspect, these changes may not always be caught by a regular anomaly point detection since the values might be inside the regular model boundaries. However, it is still important to identify the change. An example of this scenario is a service that had a new deployment for which the request duration dropped from 10 seconds to 3 seconds. If suddenly the duration observed is 7 seconds, then this change might indicate an issue in the service, but this issue will be missed by a monitoring system that failed to identify the deployment change and is still using the past data (i.e., of 10 seconds) as part of the statistical model.

Change point detection (CPD) consists of detecting significant change in the behavior of a stochastic process. CPD has been applied to several fields such as financial market analysis, medicine, climate science or system monitoring. The first methods for CPD are focused on finding change in a predefined statistic of a time series. They are also making strong assumption on the generative distribution. Among them are the Cusum algorithm model based on state space or on autoregression.

While those methods work well for specific type of distributions and changes, a need arises for more generic solutions and non-parametric algorithms. Unfortunately methods such as kernel density estimation suffers from the curse of dimensionality and are not applicable to real life problems. To overcome this challenge one idea was to estimate the ratio of densities between two successive window without computing the densities themselves. Such methods like KLIEP or RuLSIF were successful. Another line of research focus on Kernel two sample test where the Kernel test is used to evaluate mean discrepancy of two samples in a reproducing kernel Hilbert space. For example a test statistic was introduced using the maximum kernel fisher discriminant ratio. More recently a proposed way to learn an optimal kernel representation for CPD was introduced but requires to have labeled training data.

Still, these models are assuming that the process is time independent and hence, focus on "continuous changes" in the time series. However, very often, time series data display behavior that is seasonal. Seasonality is defined to be the tendency of time-series data to exhibit behavior that repeats itself every fixed period of time. The term season is used to represent the period of time before behavior begins to repeat itself. The problem of forecasting a seasonal time series has been widely researched in the past (Metadata analysis). The seasonal time series is a major component in many live monitoring systems where many of the metrics exhibit seasonal patterns. In Azure monitoring, service metrics monitored are many time daily seasonal (different night and day values) or weekly seasonal (weekend data varies significantly over weekdays).

In an aspect, a CPD variation for seasonal time series is described herein. For example, a time series that includes a seasonal spike every day at 10PM, representing some background process that is important for the system. In addition, the seasonal time series may exhibit some random anomalies every day. A forecasting system will quickly adapt the predictions for forecasting this peak at 10PM. If, for some reason, this process was moved to 11PM, the forecasting system is expected to quickly to detect this change and adjust the forecast values accordingly.

Accordingly, a need exists to be able to identify locations in time where there are fundamental changes in the values that are caused by different values generation function. The described aspects include performing at least one of a radial basis function (RBF) kernel procedure and an autoencoding procedure for a time-series data; determining whether one or more change points occur in a seasonal pattern of the time-series data based on at least one of the RBF kernel procedure and the autoencoding procedure; and transmitting and/or displaying, to a user, an alert indicating the one or more change points based on a determination that the one or more change points occur in the seasonal pattern of the time-series data.

Figure 2:
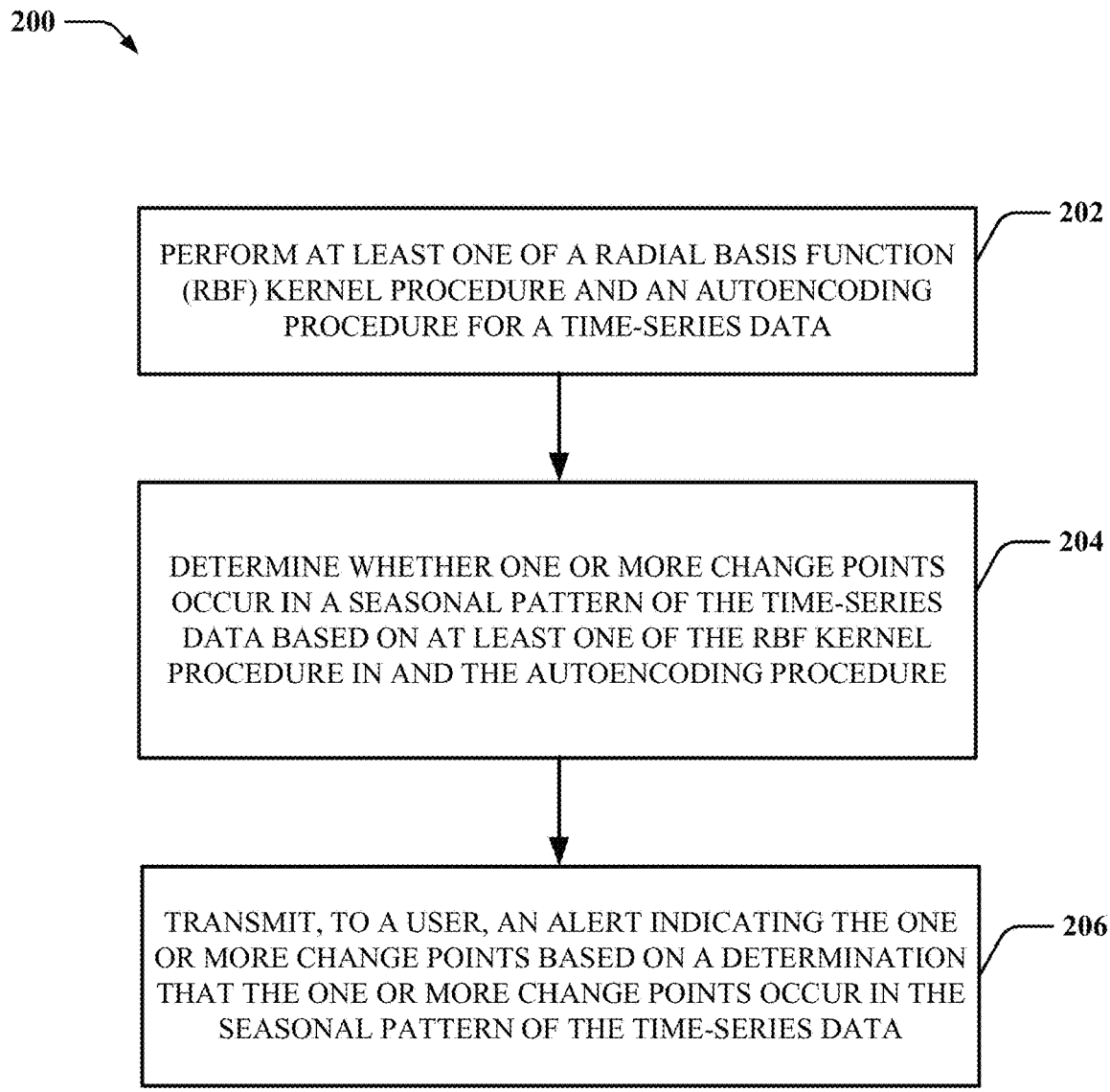
FIG. 2 is a flow diagram of an example of alerting metric baseline behavior change in accordance with examples described herein.

Turning now to FIGS. 1-6, examples are depicted with reference to one or more components and one or more methods that may perform the actions or operations described herein, where components and/or actions/operations in dashed line may be optional. Although the operations described below in FIG. 2 are presented in a particular order and/or as being performed by an example component, the ordering of the actions and the components performing the actions may be varied, in some examples, depending on the implementation. Moreover, in some examples, one or more of the following actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a wireless communication system 100 that includes one or more networks, such as network 1 102, having one or more time-series data loggers 104 for logging time-series data occurring on resources of the network 1 102. For example, the resources of the network 1 102 may include various types of nodes, such as computing devices, databases, devices with a network-specific functionality, such as routers, bridges, firewalls, web servers, load balancers, etc., and/or the like. Each resource may have an associated time-series data logger 104 to log time-series data in a time-series data repository 106, where the time-series data logger 104 may operate on the resource or otherwise to detect communications from the resource for logging the time-series data. In an example, the service events in time-series data repository 106 may include various types of time-series data, such as processor or memory utilization on the resource, throughput of traffic on the resource, application-specific events that are definable by applications executing on the resource, etc.

A computing device 120 is provided for exposing a framework to obtain time-series data from time-series data repository 106 and for alerting metric baseline behavior change in accordance with aspects described herein. For example, computing device 120 may include or may otherwise be coupled with a processor 124 and/or memory 126, where the processor 124 and/or memory 126 may be configured to execute or store instructions or other parameters related to performing at least one of a radial basis function (RBF) kernel procedure and an autoencoding procedure for a time-series data; determining whether one or more change points occur in a seasonal pattern of the time-series data based on at least one of the RBF kernel procedure and the autoencoding procedure; and transmitting, to a user, an alert indicating the one or more change points based on a determination that the one or more change points occur in the seasonal pattern of the time-series data, as described herein. For example, processor 124 and memory 126 may be separate components communicatively coupled by a bus (e.g., on a motherboard or other portion of a computing device, on an integrated circuit, such as a system on a chip (SoC), etc.), components integrated within one another (e.g., processor 124 may include the memory 126 as an on-board component 121), and/or the like. Memory 126 may store instructions, parameters, data structures, etc., for use/execution by processor 124 to perform functions described herein.

In an example, computing device 120 may execute an operating system 128 (e.g., via processor 124 and/or memory 126) for providing an environment for executing one or more components, procedures, or applications. For example, operating system 128 may execute an alerting component 130 for receiving time-series data from the time-series data repository 106, a RBF kernel procedure 132 for computing a similarity measurement between two points in dimensions of infinite size, and detecting a mean shift value in an infinite-dimensional signal based on the similarity measurement and/or an autoencoding procedure 134 for generating a plurality of low-dimensional vectors using temporal regularization, wherein each of the plurality of low-dimensional vectors correspond to a period in time-series data.

In an example, the operating system 128 may execute the autoencoding procedure 134 to determine whether the one or more change points occur in a seasonal pattern of the time-series data based on the plurality of low-dimensional vectors, and transmit, to a user(s) 160, an alert 162 indicating the one or more change points based on a determination that the one or more change points occur in the seasonal pattern of the time-series data. The user(s) 160 may use analyzing component 164 to evaluate the alert 162 and the corresponding one or more change points that occur in a seasonal pattern of the time-series data.

FIG. 2 is a flowchart of an example of a method 200 for alerting metric baseline behavior change. For example, method 200 may be performed by the computing device 120, and is accordingly described with reference to FIG. 1, as a non-limiting example of an environment for carrying out method 200.

In method 200, action 202 includes performing at least one of a RBF kernel procedure and an autoencoding procedure for a time-series data. In an example, computing device 120 and/or alerting component 130, e.g., in conjunction with processor 124, memory 126, operating system 128, etc., may perform at least one of a RBF kernel procedure 132 and an autoencoding procedure 134 for a time-series data 106. As such, the computing device 120, e.g., in conjunction with processor 124, memory 126, communications component 602, data store 604, user interface 606, operating system, which may include the alerting component 130, may define a means for performing at least one of a RBF kernel procedure 132 and an autoencoding procedure 134 for a time-series data 106.

For example, performing the RBF kernel procedure 132 further comprises computing a similarity measurement between two points in dimensions of infinite size, and detecting a mean shift value in an infinite-dimensional signal based on the similarity measurement.

For example, performing the autoencoding procedure 134 further comprises generating, by an autoencoder, a plurality of low-dimensional vectors using temporal regularization, wherein each of the plurality of low-dimensional vectors correspond to a period in a time-series data. Additionally, determining whether the one or more change points occur in a seasonal pattern of the time-series data further comprises determining whether the one or more change points occur in a seasonal pattern of the time-series data based on the plurality of low-dimensional vectors.

In a further example, generating the plurality of low-dimensional vectors using temporal regularization further comprises generating, by an encoder, an input vector for each period of the time-series data, calculating a minimized summated difference between each period of the time-series data and a reconstructed version of the input vector, calculating a summated difference between two consecutive encoded periods of the time-series data, and generating, by a decoder, the plurality of low-dimensional vectors based on the minimized summated difference between each period of the time-series data and the reconstructed version of the input vector and the summated difference between the two consecutive encoded periods of the time-series data.

In a further example, generating the input vector for each period of the time-series data further comprises calculating an inner product between a weight matrix for a current period of the time-series data and an output of a pervious weight matrix for a previous period of the time-series data, applying a non-linear function to the inner product, and determining corresponding parameters for the weight matrix based on a gradient descent using back-propagation.

In a further example, calculating the summated difference between the two consecutive encoded periods of the time-series data further comprises applying regularization on one or more weights of a network, and applying a penalization a difference between a low-dimensional vector of two consecutive periods.

In a further example, determining whether the one or more change points occur in the seasonal pattern of the time-series data based on the plurality of low-dimensional vectors further comprises determining a location for each of the plurality of low-dimensional vectors; and performing hierarchical clustering procedure for the plurality of low-dimensional vectors based on the location for each of the plurality of low-dimensional vectors.

In a further example, performing hierarchical clustering procedure for the plurality of low-dimensional vectors based on the location for each of the plurality of low-dimensional vectors further comprises calculating a silhouette score based on a mean pairwise distance of the location for each of the plurality of low-dimensional vectors in a cluster and a mean distance of each location for each of the plurality of low-dimensional vectors in a neighboring cluster, determining whether the silhouette score satisfies a hyper-parameter threshold, and selecting a partition based on a determination that the silhouette score satisfies the hyperparameter threshold.

In an example, the time-series data corresponds to seasonal time-series data that has a tendency to exhibit behavior that repeats every fixed period of time.

In method 200, action 204 includes determining whether one or more change points occur in a seasonal pattern of the time-series data based on at least one of the RBF kernel procedure and the autoencoding procedure. In an example, computing device 120 and/or alerting component 130, e.g., in conjunction with processor 124, memory 126, operating system 128, etc., may determine whether one or more change points occur in a seasonal pattern of the time-series data based on at least one of the RBF kernel procedure 132 and the autoencoding procedure 134. As such, the computing device 120, e.g., in conjunction with processor 124, memory 126, communications component 602, data store 604, user interface 606, operating system, which may include the alerting component 130, may define a means for determining whether one or more change points occur in a seasonal pattern of the time-series data based on at least one of the RBF kernel procedure 132 and the autoencoding procedure 134.

In method 200, action 206 includes transmitting, to a user, an alert indicating the one or more change points based on a determination that the one or more change points occur in the seasonal pattern of the time-series data. In an example, computing device 120 and/or alerting component 130, e.g., in conjunction with processor 124, memory 126, operating system 128, etc., may transmit, to a user 160, an alert indicating the one or more change points based on a determination that the one or more change points occur in the seasonal pattern of the time-series data. As such, the computing device 120, e.g., in conjunction with processor 124, memory 126, communications component 602, data store 604, user interface 606, operating system, which may include the alerting component 130, may define a means for transmitting, to a user 160, an alert indicating the one or more change points based on a determination that the one or more change points occur in the seasonal pattern of the time-series data.

In a further example, method 200 may optionally determine that no change points exist based on a determination that the silhouette score fails to satisfy the hyper-parameter threshold.

Figure 3:
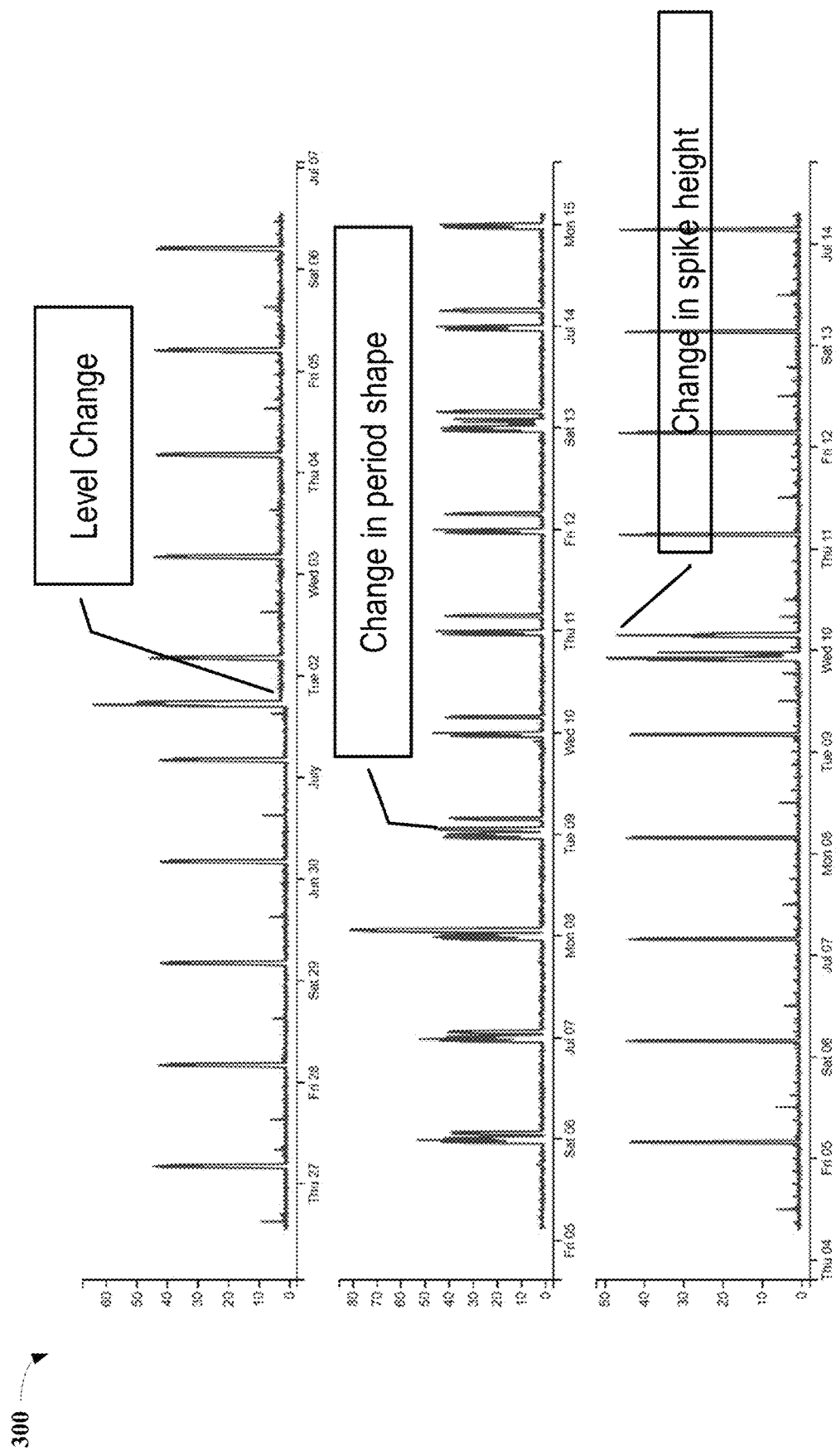
FIG. 3 is a graphical diagram of an example of detecting changes in the time-series data distribution in accordance with examples described herein.

FIG. 3 is a graphical diagram 300 of an example of detecting changes in the time-series data distribution. For example, an alerting component, such as alerting component 130 of FIG. 1 may detect a variety of changes including a level change, a change in period shape, and/or a change in spike height. Based on these changes, the alerting component 130 may determine whether a point change occurs as described further herein.

FIG. 3 is a diagram of an example of an autoencoder 300 for detecting change in seasonal pattern by deep dimensionality reduction. For example, a change-point detection problem is to discover abrupt property changes in the generation process of a time-series data. The autoencoder 300 structure may learn the metric typical behavioral pattern in each seasonal cycle, and the autoencoder 300 is then able to accurately and efficiently estimate the existence of a change point by clustering the representations of the seasonal periods in the data.

In an aspect, with regard to change point detection (CPD), given a sequence of 1-dimensional observations of length $N\{\{x_1, \ldots, x_t, \ldots, x_N\}, x_i \in R$, a change point $t_0$ is a point such that, for $t < t_0$, $x_t$ are sampled i. d. d. from a distribution $F_1$, for $t > t_0$, $x_t$ are sampled i. d. d. from the distribution $F_2$ with $F_1 \neq F_2$.

However, for a seasonal time-series the assumption that up to the change-point all samples are i. d. d. from a single distribution is incorrect. For example, the time-series being seasonal implies the samples are not i. d. d. In the extreme, it might be that each observation inside a single period window is drawn from an entirely different distribution. However, as the targeting metric is generated by one origin system, a more generalized assumption would be the data points have some common generator function F and some seasonal factor addition $S_{i'}$, where i' is the seasonal phase of the i'th value in the time series (i.e., if p is the season length, then i'=i mod p.

In an aspect, given a time series with seasonality of length p, denote a single seasonal window of observations of size p by $w_i = x_{i1}, \ldots x_{ip}$ are all the observations that belong to $w_i$ seasonal window. The original time series may be represented by grouping the original time series to seasonal windows creating $\{w_1, \ldots, w_t, \ldots\}$, $w_i \in R^p$. For example, $S_1, \ldots S_p$ and F may be defined as the combined distribution functions for which each seasonal point in a seasonal frame is drawn from, i.e., $x_{ij}$ is drawn i. d. d. from distribution $S_j \otimes F$, where $\otimes$ can be an additive or a multiplicative factor.

In an aspect, seasonal change point detection (SCPD) may correspond to a change point in seasonal pattern, such that a point $t_0$ such that $x_{ij}$ is drawn i. d. d. from distribution $S_j \otimes F$ while after $t_0$, at least one of the seasonal location sample are i. d. d. drawn from different distributions, i.e., there exists a $k \in 1 \ldots p$ such that $x_{ik}$ is drawn i. d. d. from distribution $Q_k \neq S_j \otimes F$.

Returning to the example, if in a time series with daily seasonality there used to be a process triggered at 10PM exactly for one hour, and after some point in time t, the timing of the process being moved to 11PM, then the CPD problem would not define this point in time as a change point, while the SCPD will identify this as a change point i.e., change in the seasonal distribution component of both $S_{10PM}$ distribution function and $S_{11PM}$ distribution function. If, on the other hand, the backup process is dropped all together (e.g., no more spikes are generated) this would be considered as a change point for both definitions. While CPD is centered around the cumulative values distribution parameters such as median and variance of the time series values, SCDP also focuses on the shape and proportions between the values observed in each period cycle.

In an aspect, autoencoder 300 corresponds to a neural network that attempts to copy the input to the output. For example, autoencoder 300 is able to detect changes in the seasonal pattern of a time-series data. Autoencoder 300 starts by capturing the main pattern of each period in the time-series data. The aim is to have close encoding (in term of Euclidean distance) for two periods that behave similar, and different ones if there is an abrupt change between two windows. By having such a representation, autoencoder 300 may detect if there has been a change point by examining the Euclidean distance between two adjacent encoded period in the time series.

In an aspect, autoencoder 300 comprises an encoder function that maps the input to an encoded version and a decoder that perform the reconstruction. For example, autoencoder 300 is trained to reconstruct fix-sized windows of time-series data. In this example, $x_i \in R^{d \times p}$ is the $i^{th}$ window of size p in a d-dimensional time series, $f_{\theta_1}: R^{d \times p} \to R^{d \times q}$ our encoder function, $g_{\theta_2}: R^{d \times q} \to R^{d \times p}$ the decoder function and n the total number of windows. $\theta_1$ and $\theta_2$ are a set of parameters that may be learned by gradient descent using back-propagation. In an example, autoencoder 300 may be described using equation (1):

$$\min_{\theta_1,\theta_2} \Sigma_{i=1}^{n} \|x_i - g_{\theta_2}(f_\theta(x_i))\|_2 + \lambda(\|\theta_1\|_2 + \|\theta_2\|_2) \quad (1)$$

The encoder function $f_{\theta 1}$ is a 3 layer feed-forward neural network. Each layer consists of a linear function and a hyperbolic tangent function. Equation (2) shows how the layer output z is computed from its input x. The decoder is a 2 layer neural network, with a similar activation function.

$$y = Wx + b, z = \frac{e^y - e^{-y}}{e^y + e^{-y}} \quad (2)$$

The shape of W in the layers determines whether W increases, decreases or leaves unchanged the dimension of the output. The autoencoder 300 may reduce the dimension during the encoding phase and increase the dimension back then. This way only the main information for the reconstruction will be stored in the encoding.

In an aspect, in order to encourage the network to generate similar low-dimensional representation, temporal regularization may be introduced to equation (1). For example, temporal regularization penalizes the network for a difference between the encoding of two consecutive periods. The resulting loss function is described in equation (3). The second part of equation (3) corresponds to temporal regularization as it applies on neighbor periods in the time-series data.

$$\min_{\theta_1,\theta_2} \Sigma_{i=1}^{n} \|x_i - g_{\theta_2}(f_\theta(x_i))\|_2 + \lambda(\|\theta_1\|_2 + \|\theta_2\|_2) + \gamma \Sigma_{i=1}^{n-1} \|h_{i=1} - h_i\|_1 \quad (3)$$

Figure 4:
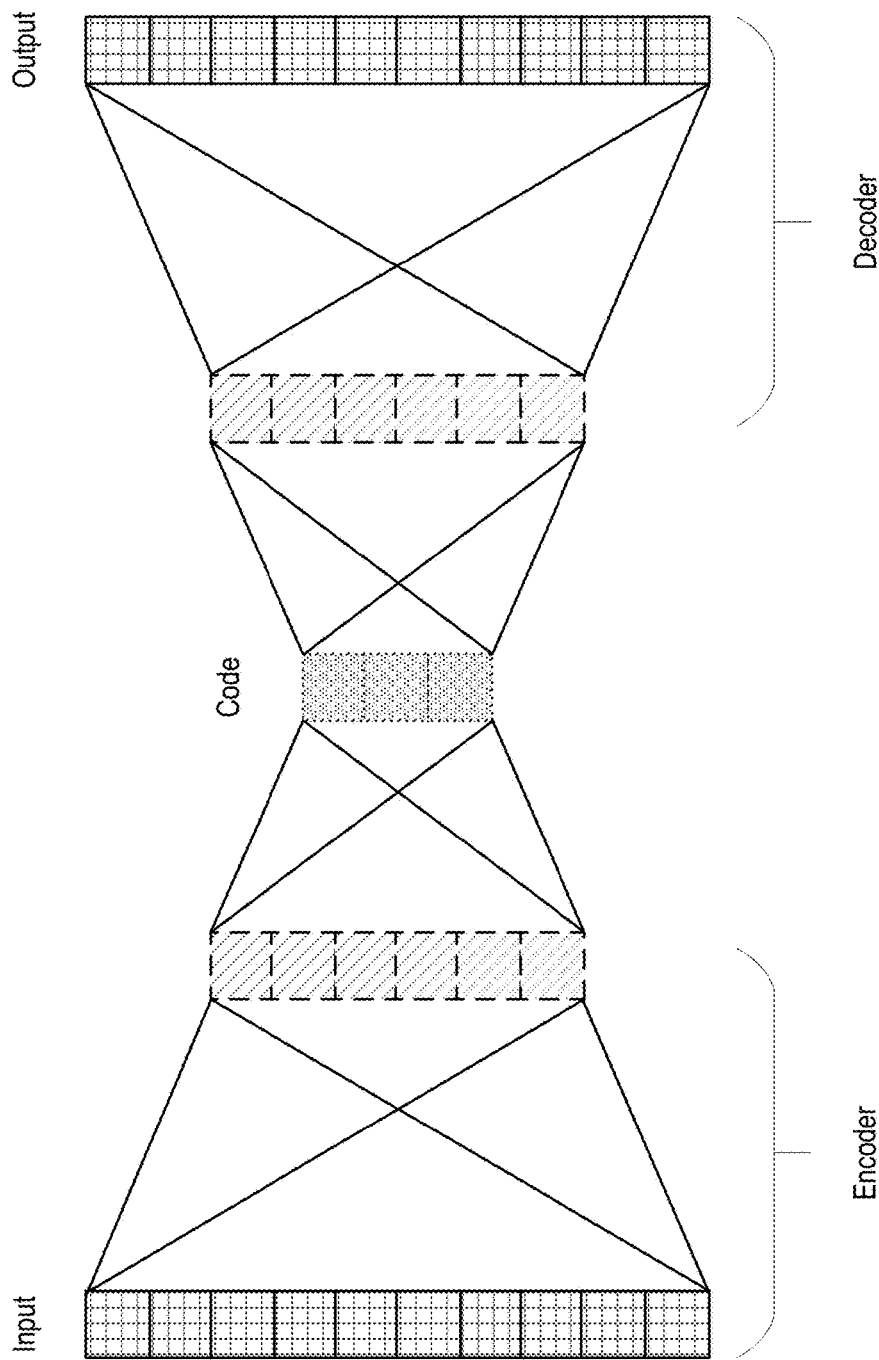
FIG. 4 is a diagram of an example autoencoder for detecting changes in seasonal patterns by deep dimensionality reduction in accordance with examples described herein.
Figure 5:
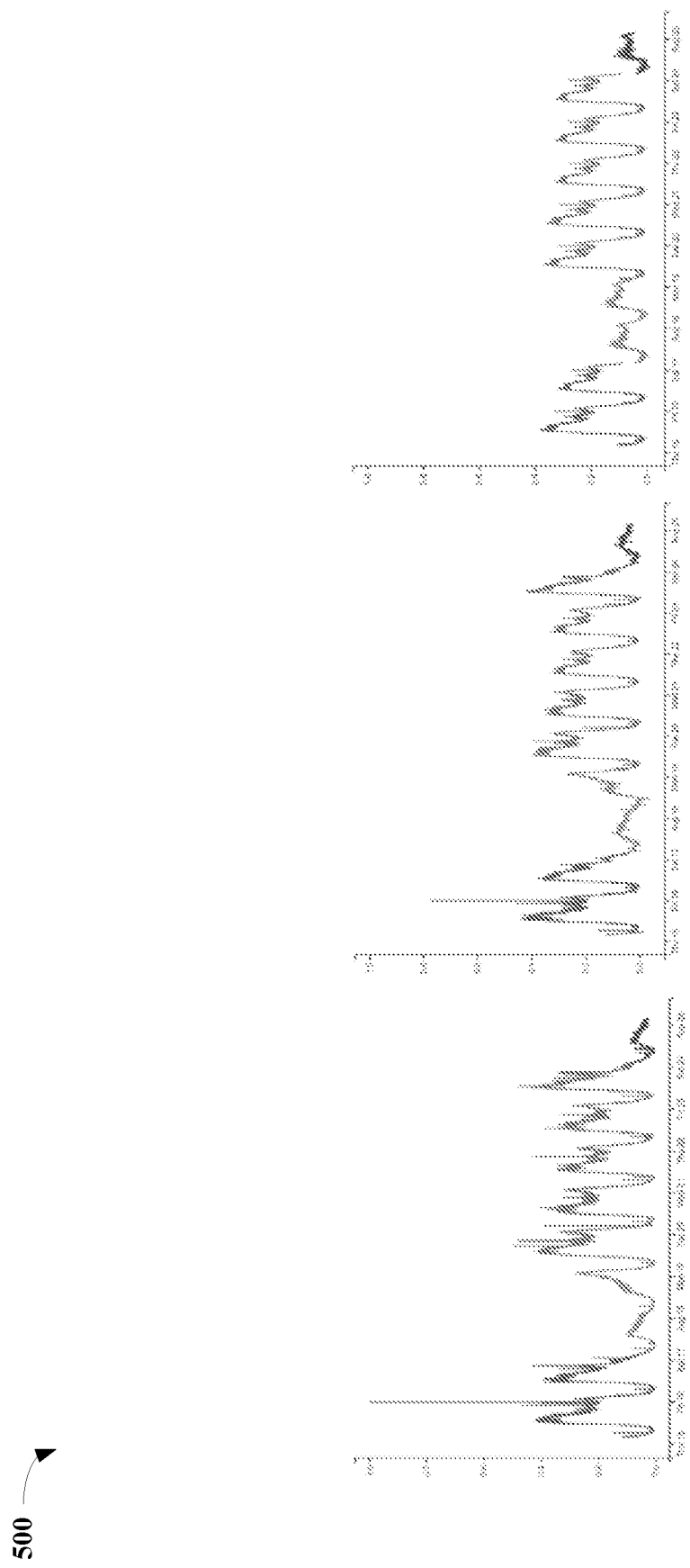
FIG. 5 is a graphical diagram of an example the effects of temporal regularization in accordance with examples described herein.

The effects of the temporal regularization are depicted in the graphical diagram 400 of FIG. 4. As depicted, temporal regularization smooths out any outliers and creates repeated patterns for the seasonal time-series data.

Once every window is mapped to an embedding in a reduced space, finding change points becomes much easier. Autoencoder 300 finds groups of similar windows, based on their location in the space. A change point may be detected if two consecutive points does not end up in the same partition.

In an aspect, to detect two consecutive points, a k-means clustering algorithm may be used. In order to find the best number of clusters, and thus the number of change points, a silhouette score is used. The silhouette score, equation (4), compares the mean pairwise distance of points in the same cluster (a) with mean distance of each points to the nearest cluster (b):

$$\frac{b-a}{\max(a,b)} \quad (4)$$

The k-means clustering algorithm runs iteratively on candidate numbers of change points and selects the best silhouette score. If the silhouette score is larger than a specified threshold (which is a hyper-parameter threshold of the model), then the resulting partition is selected. Otherwise, when the silhouette is not larger than the specified threshold then no changes occurred.

Figure 6:
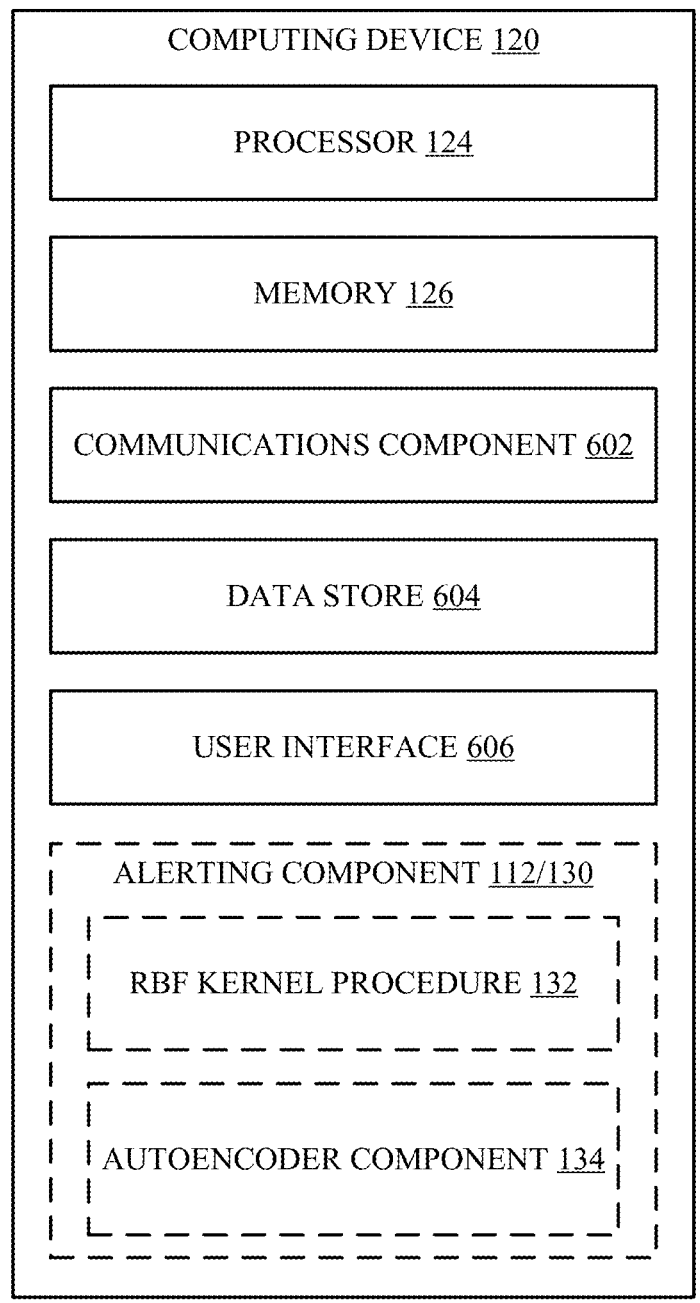
FIG. 6 is a schematic diagram of an example of a computing device for performing functions described herein.

FIG. 6 illustrates an example of computing device 120 including additional optional component details as those shown in FIG. 1. In one example, computing device 120 may include processor 124 for carrying out processing functions associated with one or more of components and functions described herein. Processor 124 may include a single or multiple set of processors or multi-core processors. Moreover, processor 124 may be implemented as an integrated processing system and/or a distributed processing system.

Computing device 120 may further include memory 126, such as for storing local versions of applications being executed by processor 124, related instructions, parameters, etc. Memory 126 may include a type of memory usable by a computer, such as random access memory (RAM), read only memory (ROM), tapes, magnetic discs, optical discs, volatile memory, non-volatile memory, and any combination thereof. Additionally, processor 124 and memory 126 may include and execute an operating system executing on processor 124, one or more applications, such as an alerting component 130, graphing component 132, query processing component 134, and/or components thereof, as described herein, and/or other components of the computing device 120.

Further, computing device 120 may include a communications component 602 that provides for establishing and maintaining communications with one or more other devices, parties, entities, etc. utilizing hardware, software, and services as described herein. Communications component 602 may carry communications between components on computing device 120, as well as between computing device 120 and external devices, such as devices located across a communications network and/or devices serially or locally connected to computing device 120. For example, communications component 602 may include one or more buses, and may further include transmit chain components and receive chain components associated with a wireless or wired transmitter and receiver, respectively, operable for interfacing with external devices. For example, communications component 602 may carry communications between an alerting component 130, graphing component 132, query processing component 134, etc. executing on another device (or the same device), etc., as described in various examples herein.

Additionally, computing device 120 may include a data store 604, which may be any suitable combination of hardware and/or software, that provides for mass storage of information, databases, and programs employed in connection with examples described herein. For example, data store 604 may be or may include a data repository for applications and/or related parameters not currently being executed by processor 124, may include the time-series data repository 106, etc. In addition, data store 1004 may be a data repository for an operating system, application, such as an alerting component 130, graphing component 132, query processing component 134, and/or components thereof, etc. executing on the processor 124, and/or one or more other components of the computing device 120.

Computing device 120 may also include a user interface component 606 operable to receive inputs from a user of computing device 120 and further operable to generate outputs for presentation to the user (e.g., via a display interface to a display device). User interface component 606 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, any other mechanism capable of receiving an input from a user, or any combination thereof. Further, user interface component 1006 may include one or more output devices, including but not limited to a display interface, a speaker, a haptic feedback mechanism, a printer, any other mechanism capable of presenting an output to a user, or any combination thereof.

Computing device 120 may also include an alerting component 130 for generating a query context related to one or more service events, a graphing component 132 for generating a multiple-layer relational graph defining relationships between service events, and/or a query processing component 134 for processing queries for service events by providing one or more other service events based on relationships defined in the multiple-layer relational graph, as described herein.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more examples, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various examples described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A computer-implemented method comprising:
   performing, by an alerting component of a computing device, an autoencoding procedure for time-series data occurring on a resource of a network, the time-series data including at least one of processor or memory utilization metrics for the resource, the alerting component comprising the autoencoding procedure;
   identifying a seasonal pattern of the time-series data based on the autoencoding procedure, wherein the seasonal pattern defines a tendency of the time-series data to exhibit behavior that repeats on the network over a fixed period of time and that is characterized by a shape and proportions between values observed in the fixed period of time;
   determining a first shape of a first graphical depiction representing the at least one of processor or memory utilization metrics observed on the network in the fixed period at a first time;
   determining a second shape of a second graphical depiction representing the at least one of processor or memory utilization metrics observed on the network in the fixed period at a second time;
   determining that one or more change points occur in the seasonal pattern based on a difference between the first shape and the second shape; and
   transmitting, by the alerting component, an alert indicating the one or more change points based on determining that the one or more change points occur in the seasonal pattern of the time-series data, the alert enabling evaluation of the one or more change points.

2. The computer-implemented method of claim 1, wherein performing the autoencoding procedure further comprises generating, by an autoencoder, a plurality of low-dimensional vectors using temporal regularization, wherein each of the plurality of low-dimensional vectors correspond to a period in the time-series data, and
   wherein determining that the one or more change points occur in the seasonal pattern further comprises determining whether the one or more change points occur in the seasonal pattern of the time-series data based on the plurality of low-dimensional vectors.

3. The computer-implemented method of claim 2, wherein generating the plurality of low-dimensional vectors using the temporal regularization further comprises:
   generating, by an encoder, an input vector for each period of the time-series data;
   calculating a minimized summated difference between each period of the time-series data and a reconstructed version of the input vector;
   calculating a summated difference between two consecutive encoded periods of the time-series data; and
   generating, by a decoder, the plurality of low-dimensional vectors based on the minimized summated difference between each period of the time-series data and the reconstructed version of the input vector and the summated difference between the two consecutive encoded periods of the time-series data.

4. The computer-implemented method of claim 3, wherein generating the input vector for each period of the time-series data further comprises:

calculating an inner product between a weight matrix for a current period of the time-series data and an output of a pervious weight matrix for a previous period of the time-series data;
applying a non-linear function to the inner product; and
determining corresponding parameters for the weight matrix based on a gradient descent using back-propagation.

5. The computer-implemented method of claim 3, wherein calculating the summated difference between the two consecutive encoded periods of the time-series data further comprises:
applying regularization on one or more weights of a network; and
applying a penalization a difference between a low-dimensional vector of two consecutive periods.

6. The computer-implemented method of claim 2, wherein determining whether the one or more change points occur in the seasonal pattern of the time-series data based on the plurality of low-dimensional vectors further comprises:
determining a location for each of the plurality of low-dimensional vectors; and
performing hierarchical clustering procedure for the plurality of low-dimensional vectors based on the location for each of the plurality of low-dimensional vectors.

7. The computer-implemented method of claim 6, wherein performing the hierarchical clustering procedure for the plurality of low-dimensional vectors based on the location for each of the plurality of low-dimensional vectors further comprises:
calculating a silhouette score based on a mean pairwise distance of the location for each of the plurality of low-dimensional vectors in a cluster and a mean distance of each location for each of the plurality of low-dimensional vectors in a neighboring cluster;
determining whether the silhouette score satisfies a hyperparameter threshold; and
selecting a partition when the silhouette score satisfies the hyperparameter threshold.

8. The computer-implemented method of claim 7, further comprising determining that no change points exist when the silhouette score fails to satisfy the hyperparameter threshold.

9. The computer-implemented method of claim 1, wherein the alerting component further comprises a radial basis function (RBF) configured to:
compute a similarity measurement between two points in dimensions of infinite size; and
detect a mean shift value in an infinite-dimensional signal based on the similarity measurement.

10. The computer-implemented method of claim 1, wherein the utilization metrics for the resource further include at least one of:
throughput of traffic on the resource; or
application-specific events that are definable by applications executing on the resource.

11. A computing device comprising:
a memory; and
at least one processor coupled to the memory, wherein the at least one processor is configured to:
perform, by an alerting component of the computing device, an autoencoding procedure for time-series data occurring on a resource of a network, the time-series data including utilization metrics for the resource, the utilization metrics including at least one of:
processor utilization metrics;
memory utilization metrics; or
application-specific events for an application executing on the resource;
identifying a seasonal pattern of the time-series data based on the autoencoding procedure, wherein the seasonal pattern defines a tendency of the time-series data to exhibit behavior that repeats on the network over a fixed period of time and that is characterized by a shape and proportions between values observed in the fixed period of time;
determining a first shape of a first graphical depiction representing the utilization metrics observed on the network in the fixed period at a first time;
determining a second shape of a second graphical depiction representing the utilization metrics observed on the network in the fixed period at a second time;
determine that one or more change points occur in the seasonal pattern based on a difference between the first shape and the second shape;
generate, by the alerting component, an alert indicating the one or more change points in the seasonal pattern; and
transmit the alert to a second device for evaluation.

12. The computing device of claim 11, wherein the at least one processor configured to perform the autoencoding procedure is further configured to generate, by an autoencoder, a plurality of low-dimensional vectors using temporal regularization, wherein each of the plurality of low-dimensional vectors correspond to a period in the time-series data, and wherein the at least one processor configured to determine whether the one or more change points occur in the seasonal pattern of the time-series data is further configured to determine whether the one or more change points occur in the seasonal pattern of the time-series data based on the plurality of low-dimensional vectors.

13. The computing device of claim 12, wherein the at least one processor configured to generate the plurality of low-dimensional vectors using temporal regularization is further configured to:
generate, by an encoder, an input vector for each period of the time-series data;
calculate a minimized summated difference between each period of the time-series data and a reconstructed version of the input vector;
calculate a summated difference between two consecutive encoded periods of the time-series data; and
generate, by a decoder, the plurality of low-dimensional vectors based on the minimized summated difference between each period of the time-series data and the reconstructed version of the input vector and the summated difference between the two consecutive encoded periods of the time-series data.

14. The computing device of claim 12, wherein the at least one processor configured to determine whether the one or more change points occur in the seasonal pattern of the time-series data based on the plurality of low-dimensional vectors is further configured to:
determine a location for each of the plurality of low-dimensional vectors; and
perform hierarchical clustering procedure for the plurality of low-dimensional vectors based on the location for each of the plurality of low-dimensional vectors.

15. The computing device of claim 14, wherein the at least one processor configured to perform the hierarchical clustering procedure for the plurality of low-dimensional vectors based on the location for each of the plurality of low-dimensional vectors is further configured to:

calculate a silhouette score based on a mean pairwise distance of the location for each of the plurality of low-dimensional vectors in a cluster and a mean distance of each location for each of the plurality of low-dimensional vectors in a neighboring cluster;

determine whether the silhouette score satisfies a hyperparameter threshold; and select a partition based on a determination that the silhouette score satisfies the hyperparameter threshold.

16. The computing device of claim 15, wherein the at least one processor is further configured to determine that no change points exist based on a determination that the silhouette score fails to satisfy the hyperparameter threshold.

17. A non-transitory computer-readable medium comprising code executable by one or more processors to:

perform an autoencoding procedure for time-series data occurring on at least one resource of a network, the time-series data including at least one of processor or memory utilization metrics for the at least one resource;

identifying a seasonal pattern of the time-series data based on the autoencoding procedure, wherein the seasonal pattern defines a tendency of the time-series data to exhibit behavior that repeats on the network over a fixed period of time and that is characterized by a shape and proportions between values observed in the fixed period of time;

determining a first shape of a first graphical depiction representing the at least one of processor or memory utilization metrics observed on the network in the fixed period at a first time;

determining a second shape of a second graphical depiction representing the at least one of processor or memory utilization metrics observed on the network in the fixed period at a second time;

determining that one or more change points occur in the seasonal pattern based on a difference between the first shape and the second shape; and transmitting an alert indicating the one or more change points based on determining that the one or more change points occur in the seasonal pattern of the time-series data.

18. The computer-readable medium of claim 17, wherein the autoencoding procedure detects the one or more change points by examining a Euclidean distance between two adjacent encoded periods in the time-series data.

19. The computer-readable medium of claim 17, wherein the autoencoding procedure is a 3 layer feed-forward neural network, each layer of the neural network including a linear function and a hyperbolic tangent function.

20. The computer-readable medium of claim 17, wherein the shape characterizing the behavior includes a spike in a height of the time-series data within the seasonal pattern.

* * * * *